Oct. 2, 1951     R. H. DAVIES     2,569,881
REMOTELY CONTROLLED REVERSING VALVE
Filed June 7, 1945     7 Sheets-Sheet 7

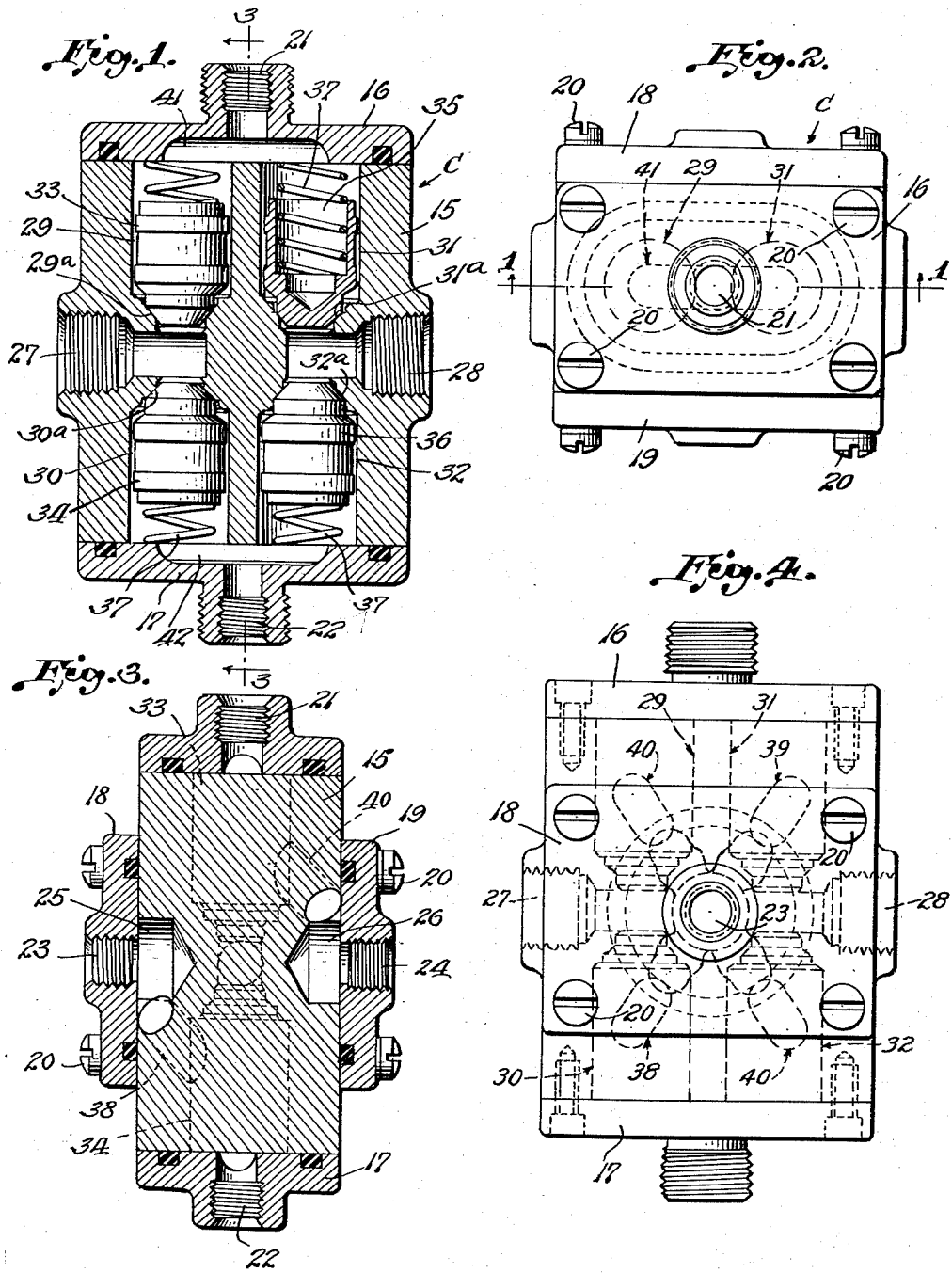

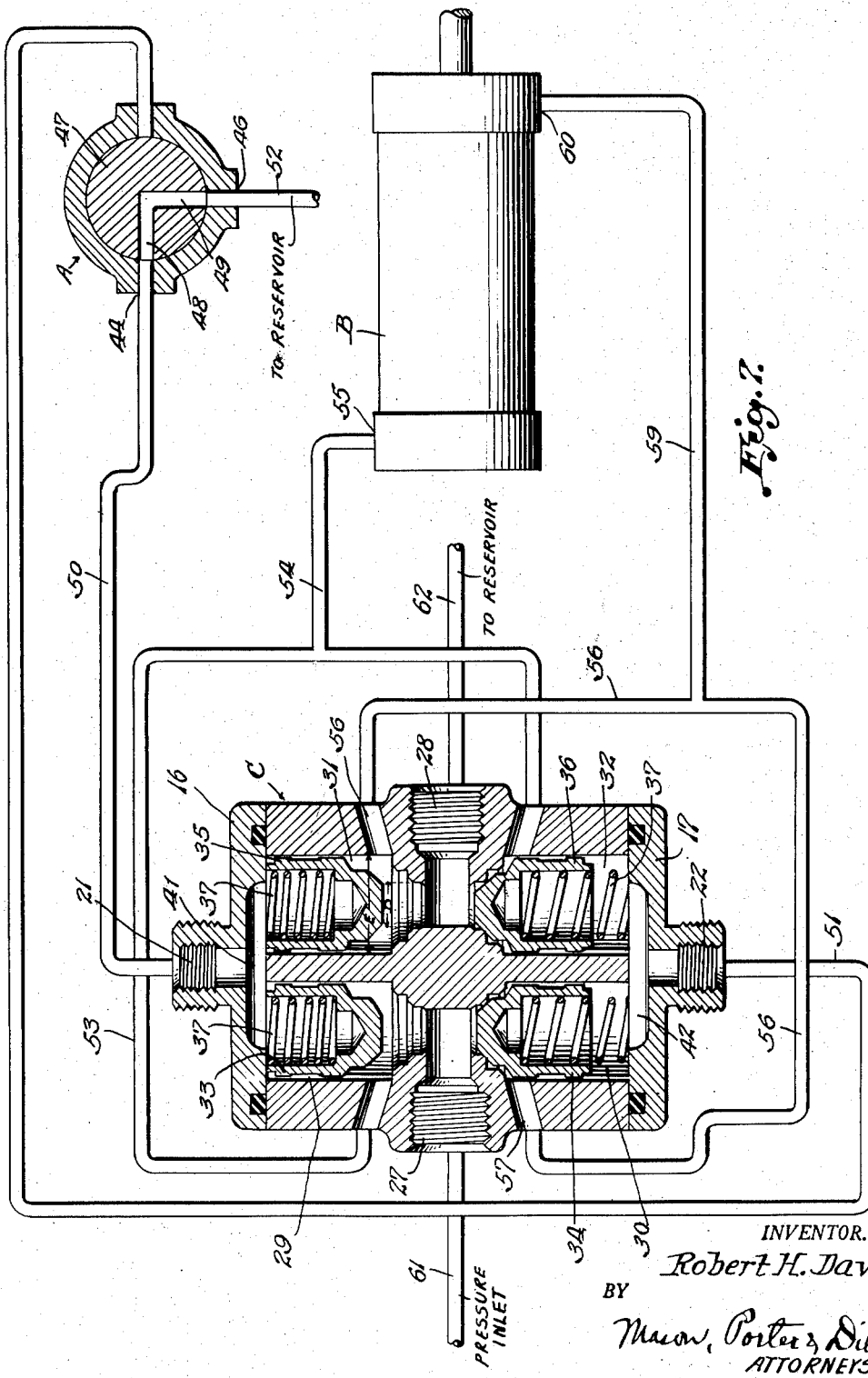

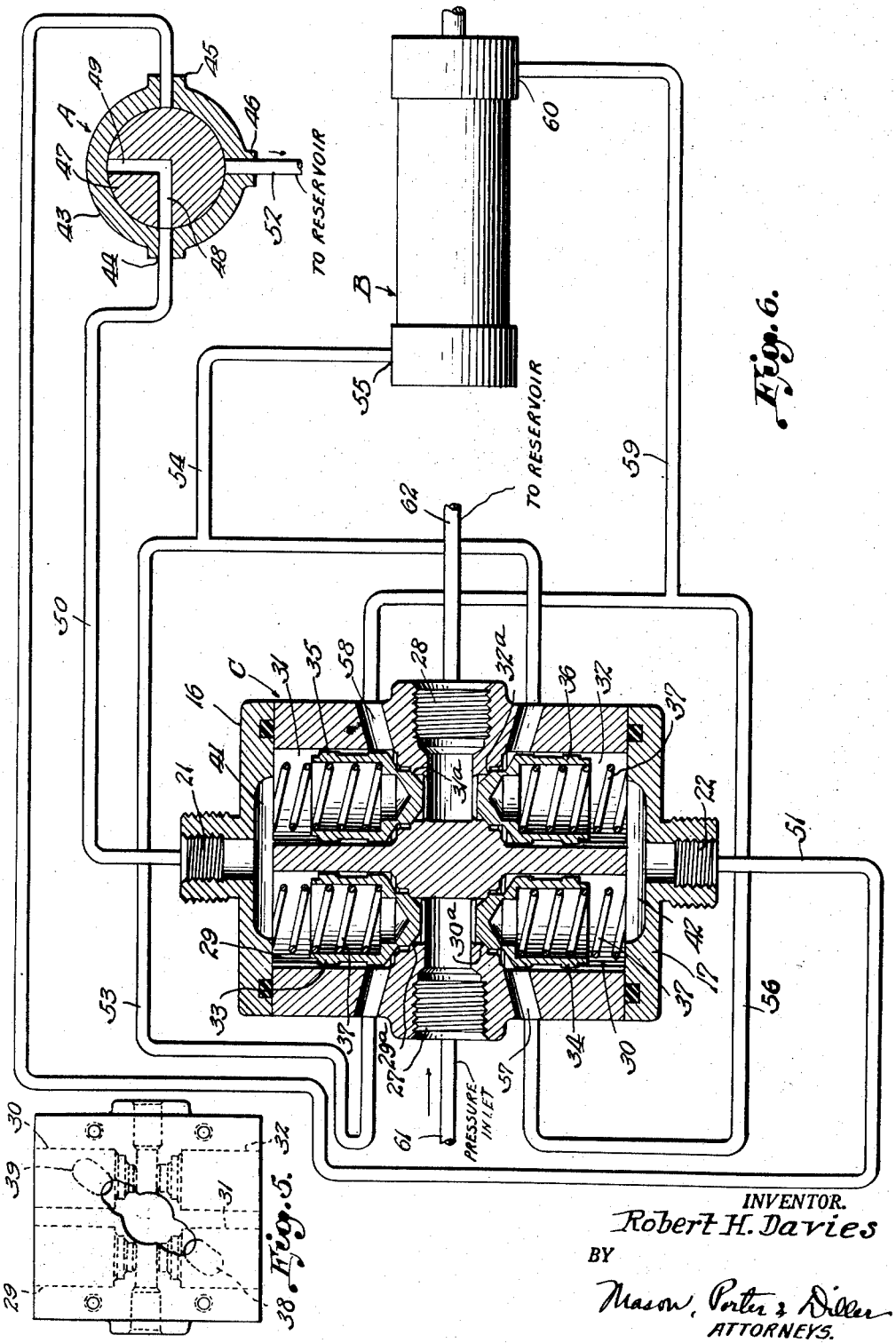

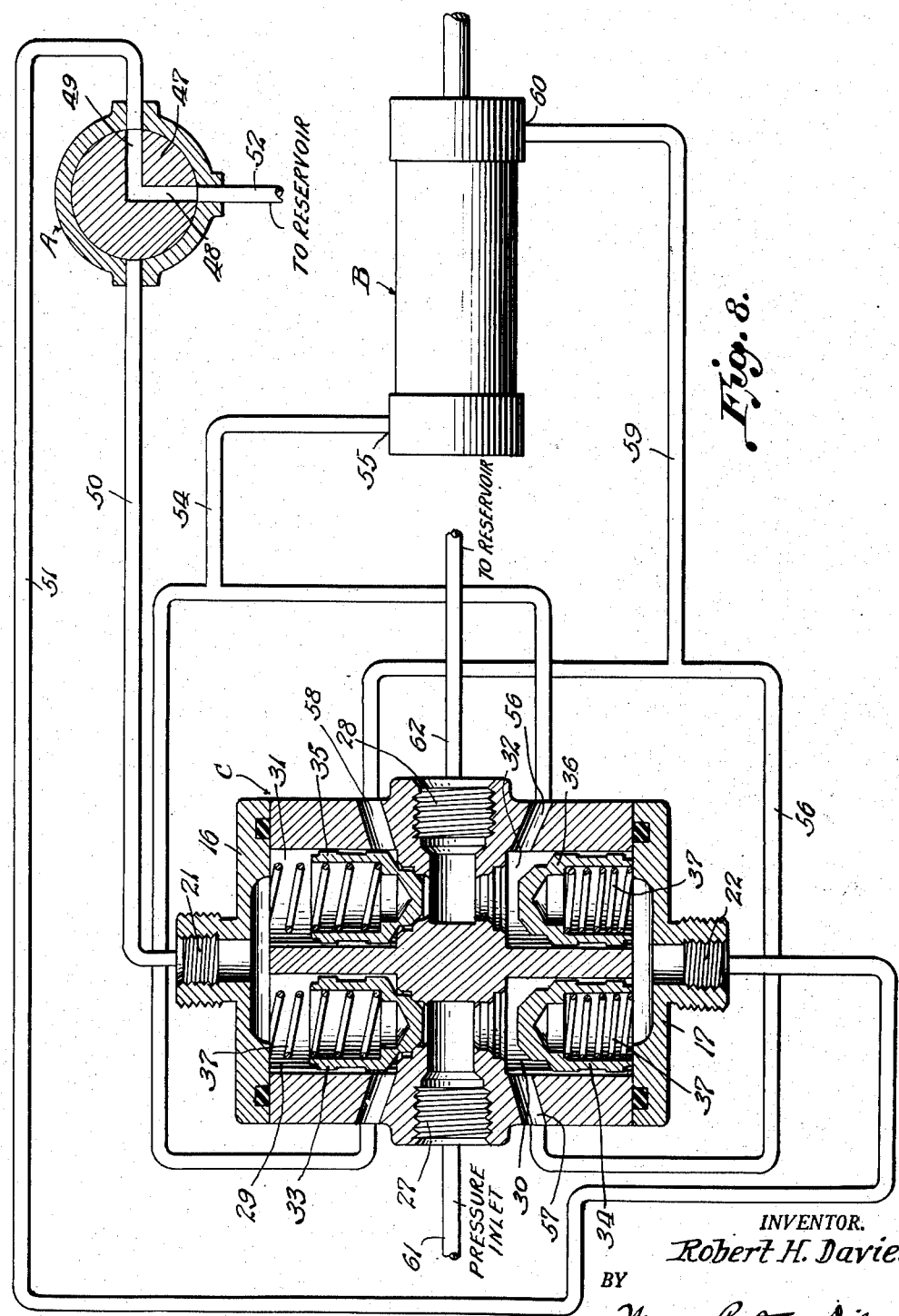

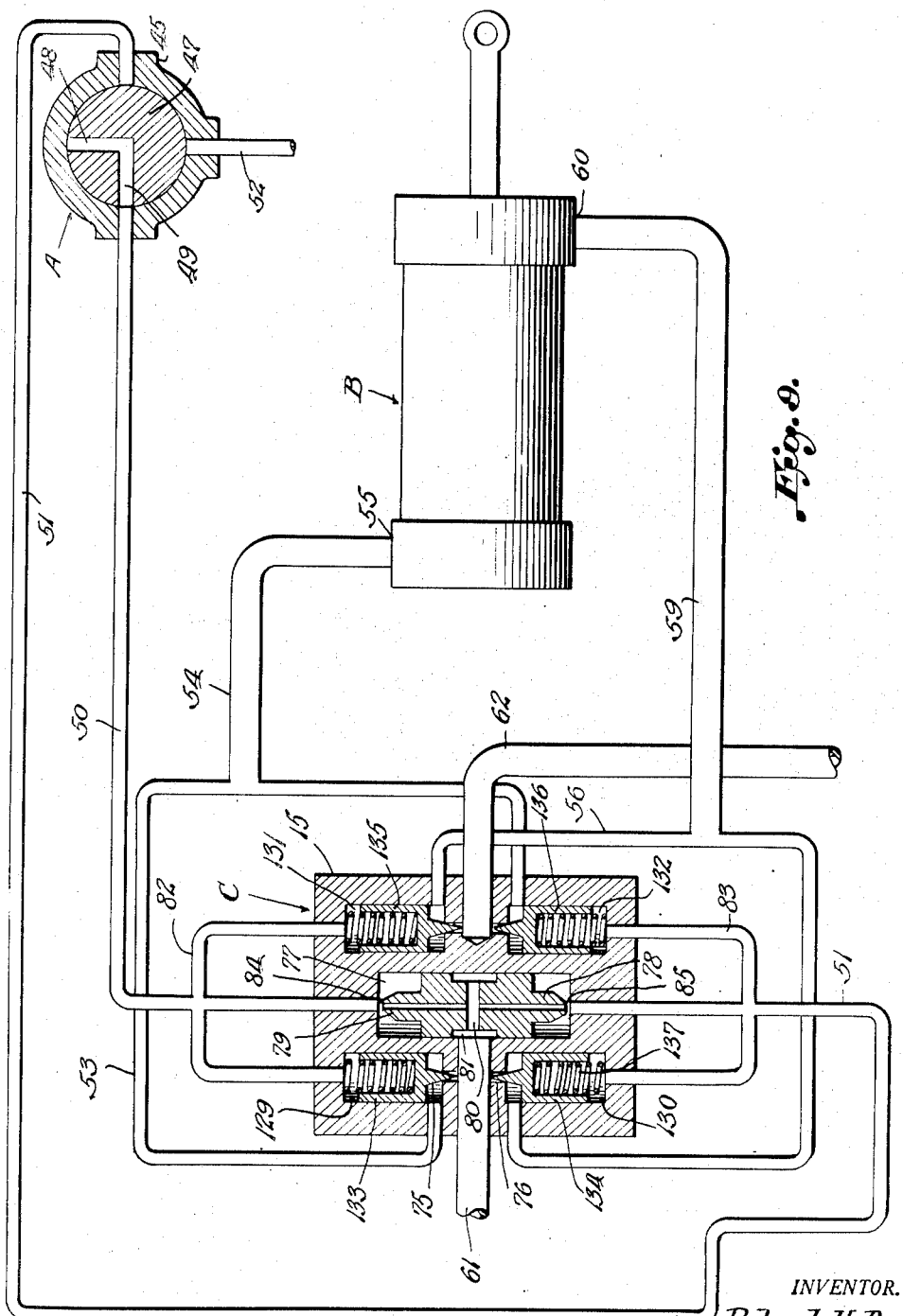

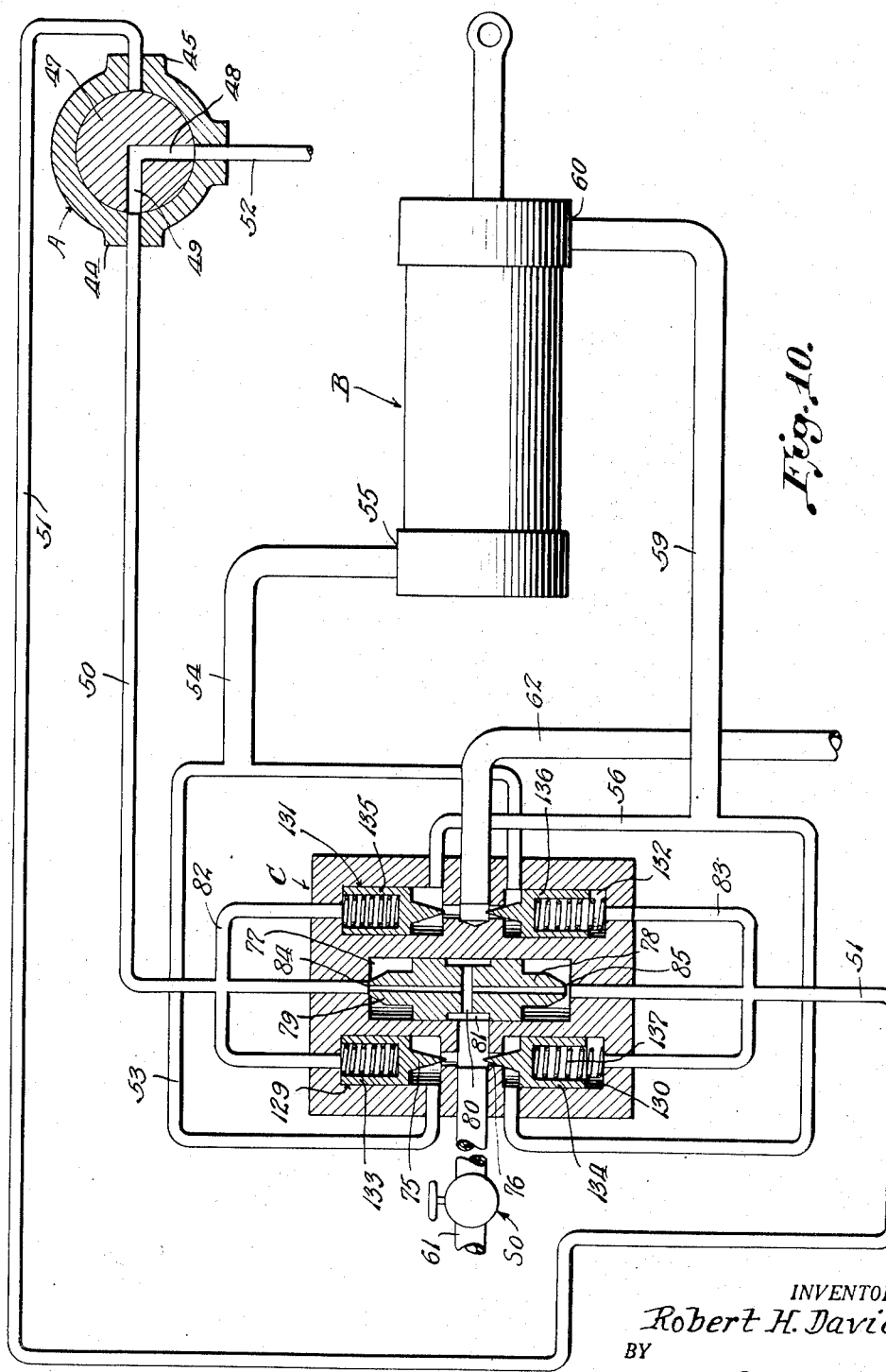

INVENTOR.
*Robert H. Davies*
BY
*Mason, Porter & Diller*
ATTORNEYS.

Patented Oct. 2, 1951

2,569,881

UNITED STATES PATENT OFFICE 2,569,881

REMOTELY CONTROLLED REVERSING VALVE

Robert H. Davies, Cleveland, Ohio, assignor to The Parker Appliance Company, Cleveland, Ohio, a corporation of Ohio Application June 7, 1945, Serial No. 598,101

12 Claims. (Cl. 121—46.5)

The present invention relates broadly to valve systems and more particularly to a remotely controlled reversing valve as used in the system.

An important object of the invention is to provide a series of pressure seated valves adapted to be remotely controlled for relieving the pressure which seats them to permit fluid under pressure to be conveyed for operating a hydraulic device such as a piston or vane type motor.

Another object of the invention is to provide a system of valves adapted to be operated by a remotely positioned control valve for operating a hydraulic device such as a motor, said valves being normally pressure seated but upon operation of the control valve in one direction, fluid pressure on the outlet side of certain of the valves will be connected to a reservoir thus leaving said valves free to be lifted by fluid pressure from the inlet side, whereby pressure fluid is conveyed to the hydraulic device for operation of the same. Operation of the control valve in another direction will free certain other valves in the same manner to operate the hydraulic device in the reverse direction.

The above and other objects of the invention will in part be obvious and will be hereinafter more fully pointed out.

In the drawings:

Figure 1 is a vertical sectional view of the reversing valve detached from the system, the series of valves which combine to form the reversing valve being shown seated.

Figure 2 is a top plan view of the reversing valve.

Figure 3 is a cross-sectional view taken substantially on line 3—3 of Figure 1.

Figure 4 is a side elevational view as viewed from the left hand side of the valve shown in Fig. 3.

Figure 5 is a right side elevational view of the main valve supporting block with the end and side caps removed.

Figure 6 is a schematic view of a system employing the reversing valve and remotely controlled valve, the remotely controlled valve being in its closed position and all valve elements of the reversing valve being likewise in a closed position.

Figure 7 is a schematic view of the system with the remotely controlled valve shifted for communication with a reservoir and two of the valve elements lifted for operating the motor in one direction.

Figure 8 is a schematic view of the system in which the control valve has been shifted to another position for communication with the reservoir and in which other valve elements have been lifted for operating the motor in a reverse direction.

Figures 9, 10 and 11 are schematic views of a modified form of the invention and correspond in their several positions to Figures 6, 7 and 8, respectively.

Figure 11:
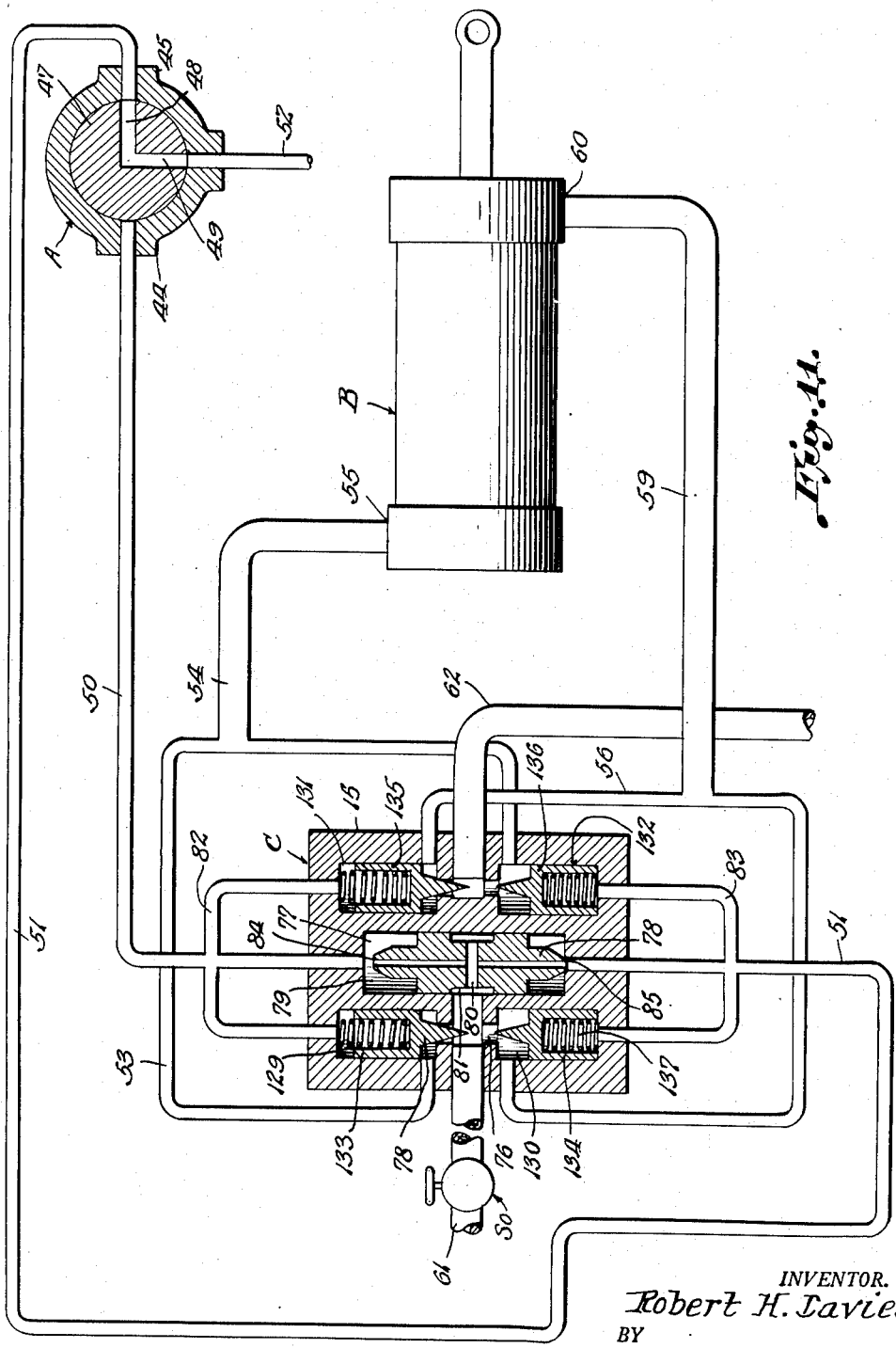

The present invention has been designed for controlling the operation of a hydraulic device such as a motor although it is capable of use with any hydraulic device wherein it is desired to convert fluid pressure into mechanical motion. In the drawings there is illustrated a motor of the piston and cylinder type but, of course, it could be a vane type motor or the like. The hydraulic device, for descriptive purposes only, will hereinafter be termed a motor. This motor is operated by fluid pressure under the control of a reversing valve and the reversing valve is in turn remotely controlled by means of a valve which may be of the rotary plug type, disk type, poppet type, etc. For purposes of illustration this control valve is of the rotary plug type but it is evident that any of the before mentioned types can be used.

Referring to the drawings for a more detailed description thereof and particularly Figures 1-8 inclusive, the control valve is designated A, the motor B and the reversing valve C, arranged in the system in the manner shown in Figures 6, 7 and 8. As will hereinafter appear operation of the control valve A will direct fluid through the reversing valve C to operate the motor B.

For a better understanding of the reversing valve per se, attention is directed to Figures 1-5 of the drawing wherein it will be seen that said reversing valve comprises a substantially rectangular shaped block 15 having top and bottom plates 16 and 17 and side plates 18 and 19, said plates being detachably secured to said block by means of cap screws or the like 20. The plates 16 and 17 are formed with threaded openings 21 and 22 each of which is in communication with the control valve A.

The plates 18 and 19 are formed with threaded openings 23 and 24 which communicate with counterbores 25 and 26 formed in the block 15 for a purpose to be hereinafter described. The block 15 is provided with a press inlet 27 and an outlet 28, said outlet 28 being in communication with a reservoir, not shown.

This block 15 is bored internally to form chambers 29, 30, 31 and 32, the chambers 29 and 30 being separated from chambers 31 and 32 in the manner clearly illustrated in Figures 1 and 6 to 8.

Each of the chambers is formed with a seat 29ª, 30ª, 31ª and 32ª for accommodating hollow piston like valve elements 33, 34, 35 and 36. By referring to Figure 1 of the drawings, it will be noted that the inner ends of the respective valve elements correspond in shape to the seats 29ª, 30ª, 31ª and 32ª so that when in closed position pressure fluid is prevented from entering the chambers 29, 30, 31 and 32. In accordance with the preferred embodiment of the invention, the valve elements 33, 34, 35 and 36 are loosely fitted in their respective chambers to permit leakage therearound for a purpose to be hereinafter more fully described. Each valve element is provided with a spring 37 having sufficient strength to normally maintain said elements in engagement with their seats. As is to be understood, the boring of the block to form the four chambers and the assembly of the valve elements therein is accomplished from each end of the block with the end plates 16 and 17 removed. After assembly of the valve elements including their springs 37, the end plates 16 and 17 provide additional means for placing the springs under compression so as to maintain the valve elements seated.

The reversing valve C further includes an arrangement whereby the outlet sides of the valve elements 33 and 36 are brought into engagement with one of the two ports connected to the motor, and the outlet sides of the valve elements 34 and 35 are brought into engagement with the one of the two ports connected to the motor. This arrangement includes diagonally disposed passages 38 and 39, see Fig. 5, which connect valve element 34 with valve element 35 with one of the passages opening into the counterbore 25. Likewise, there are diagonal passages 40 similar in form and position to those 38 and 39 previously described except for the fact that they are placed at the other side of the block, and which provide communications between the valve elements 33 and 36. Thus by this arrangement of diagonal passages, the valve elements 33 and 36 are in direct communication as are the valve elements 34 and 35.

As will hereinafter appear, upon movement of the control valve A to one position, the valve 33 will be raised by the pressure of fluid entering the inlet 27 and said pressure fluid will be directed to one port of the motor B. At the same time a certain portion of the fluid being directed toward the motor B under the control of the valve 33 will leak past the non-seated body portion of the valve 36 for cooperation with the spring engaging the same in order to maintain said valve seated. Likewise, movement of the control valve A to another position will in like manner cause the valve 34 to be moved away from its seat by the pressure of fluid entering through the inlet 27 and said pressure fluid will be directed to the other port of the motor B, some of said fluid being directed to the valve element 35 for leakage about the unseated body thereof for cooperation with the spring 37 in maintaining said valve on its seat.

The end plates 16 and 17 are counterbored as indicated at 41 and 42 and provide direct communication between the chambers closed by said plates. The counterbore 41 is furthermore in direct communication with the threaded opening 21 while the counterbore 42 is in direct communication with the threaded opening 22.

In the installation of the system for operating the motor B schematically shown in Figures 6 to 8, it will be noted that the control valve A, which is herein shown as being of the rotary plug type comprises a housing 43 having connections 44, 45 and 46. The rotary plug 47 is formed with connected right angularly disposed passages 48 and 49 adapted to be selectively brought into registry with the connections 44, 45 or 46 during the operation of the device. A line 50 connects the threaded opening 21 with the connection 44 and a line 51 connects the opening 22 with the connection 45. A line 52 leads from the connection 46 to a reservoir, not shown. Thus it will be seen that the threaded openings 21 and 22 of the reversing valve C are subject to connection with a reservoir through the control valve A. In the schematic illustration referred to line 53 is shown as connecting the valve chamber 29 and its valve 33 with the valve chamber 32 and its valve 36. This line, in said schematic illustrations, corresponds to the diagonal passage 40 previously described whereby communication is provided between diagonally disposed pairs of valve elements. A line 54 similarly connects with the line 53 and terminates at a port 55 of the motor B, and the point of connection of the line 54 should be understood to correspond to the previously described threaded opening 24 in the reversing valve C. A line 56 similarly extends from a port 57 in the chamber 30 and connects with a port 58 in the chamber 31, valve elements 34 and 35 operating in the chambers 30 and 31 respectively. The line 56 corresponds to the diagonal passages 38, 39 previously described. A line 59 connects with the line 56 at one end and to a second motor port 60 at its other end. The point of connection of the line 59 with the line 56 should be understood to correspond to the previously described threaded opening 23 in the reversing valve C. A line 61 is connected to the pressure inlet 37 while a line 62 connects the outlet 28 with a reservoir, not shown.

When control valve A is in the positions shown in Figure 6 of the drawings, all four valve elements are seated by the spring associated with each and there is a solid trapped column of fluid behind each valve therefore making it impossible to unseat any of them. It will likewise be noted that the lines 50 and 51 are shut off from communication with the reservoir. Upon shifting the position of the control valve A to the position shown in Figure 7 of the drawings, the fluid on the outlet side of valves 33 and 35 is open to the reservoir through the line 50, passages 48 and 49 and line 52. Fluid pressure entering the inlet 27 through the line 61 is sufficient to overcome the pressure exerted by the spring 37 on the valve 33 so that said valve is unseated and the high pressure fluid passes to the motor B through the lines 53 and 54. The motor B being herein shown as of the piston type will start to move toward the right as viewed in Figure 7 thereby creating a pressure in line 59 which acts on the area (D—E) to unseat valve 35 permitting this fluid being exhausted from motor B to pass to the reservoir from the outlet 28 through the line 62. Thus, at this time it will be seen that valves 33 and 35 are unseated and will be held away from their seats by the high pressure fluid actuating on valve 33 and the pressure created in the lines 56 and 59 actuating on valve 35. Of course, a certain amount of fluid being exhausted from the motor B will enter around valve 24 through the port 57. However, this fluid will soon be trapped so that substantially all of the fluid exhausted from the motor will pass to the reservoir through the line 62.

Since the valve chamber 32 and its valve 36 are in communication with the valve chamber 29 and its valve 33 through the line 53, the high pressure fluid entering the reversing valve C through the inlet 27 will get behind the valves 34 and 36 by leakage around the clearance between said valves and their chambers in which they are slide guided. As before indicated, each of the four valves are loosely fitted in their respective chambers to permit leakage and this leakage occurs when the remotely controlled valve has been operated to cause operation of the motor B. In this instance, leakage first occurs down and around the valve 36 and into the chamber 32 from where it passes into the chamber 30 through the counterbore 42. Pressure will build up behind the valves 34 and 36 to aid the springs 37 in maintaining said valves in engagement with their seats. Also, when the control valve is in the position shown in Figure 7 of the drawings, there will be a constant slight leakage around the valves 33 and 35 whereby there will be a continuous but slight flow to the reservoir through the line 50. When the piston in the motor B has moved to its extreme right hand position all four valves will remain in the position shown in Figure 7 until the position of the control valve A has been changed.

When the control valve A has been shifted to the position shown in Figure 8 of the drawings, it will be noted that the line 50 is shut off from the reservoir and that the line 51 is open to said reservoir whereby fluid on the outlet side of the valves 34 and 36 is free to pass to the reservoir through the line 51, passages 49 and 48 and line 52. Fluid pressure entering the inlet 27 then immediately unseats valve 34 and the high pressure passes to the reverse end of the motor B through the lines 55 and 59. When the piston of the fluid motor starts to move toward the left as viewed in Figure 8, the pressure created in line 54 acts on an area of the piston 36 comparable to the piston area (D—E) referred to in connection with the valve 35 and shown on Figure 7 to unseat valve 36 to pass fluid from the motor to the reservoir through the line 62 in the manner previously described. Also, as in the other position of the valves, high pressure fluid will be conveyed through the line 54 to the valve chamber 29 where it will get behind the valves 33 and 35 by leakage around the clearance between said valves and the chambers in which they are slide guided. Thus, in the position of the control valve A shown in Figure 8, the valves 34 and 36 act in the manner of the valves 33 and 35 while the valves 33 and 35 act in the manner of the valves 34 and 36 as previously described with reference to Figure 7.

When the control valve A is shifted from either of the positions shown in Figures 7 or 8 to that of Figure 6, leakage around the valves equalizes the pressure so that two said valves will be seated by spring pressure only and the other two are seated by spring pressure plus fluid pressure.

The modified form of the invention illustrated in Figures 9, 10 and 11 is similar to that described above except that the valve elements within the valve block are much more closely slide guided to prevent leakage therearound. However, as in the preferred form leakage is relied upon to aid in the operation of the valves and for this purpose a shuttle valve is employed in the modified form to obtain the required bleeding action for closing the valves and to minimize the flow through the control valve to just that which will pass through a small orifice in the shuttle.

As in the previously described form of the invention, the block 15 is bored internally to form chambers 129, 130, 131 and 132 in which are disposed closely slide guided valve elements 133, 134, 135 and 136 respectively. Each valve element is backed by a spring 137 having sufficient strength to normally maintain said valve elements in engagement with their seats. The inner ends of the valve elements are conical shaped as indicated at 75 and when in closed position as shown in Figure 9, are seated in openings 76 formed in the respective chambers. The valve chambers 129 and 130 are in direct communication with the pressure inlet line 61, and the valve chambers 131 and 132 are in direct communication with the line 62 which leads to the reservoir, not shown. This arrangement is, of course, similar to the one illustrated and hereinabove described.

The block 15 is formed with a central chamber 77 in which is mounted for slidable movement a shuttle valve 78. This shuttle valve is adapted to be raised and lowered by the pressure of fluid admitted through the inlet 61 and is formed with a restricted vertical passage 79 and an intersecting horizontal passage 80, this latter passage being connected to the inlet 61 through a counterbore 81. Fluid entering the counterbore will move the shuttle valve 78 in one direction or the other in accordance with the position of the control valve A.

The manner of connecting the reversing valve C to the control valve A and motor B is the same as in the previously described form and in describing the operation of the device, the same reference characters will be employed to indicate the various line connections. It will be noted, however, that the chambers 129 and 131 are in direct communication through the line 82 and that the chambers 130 and 132 are in communication through the line 83. The lines 82 and 83 function in the manner of the counterbores 41 and 42 provided in the previously described form. Of course, the lines 82 and 83 open into the lines 50 and 51 respectively, which connect the reversing valve C to the control valve A.

With the parts in the position shown in Figure 9 of the drawings, the entire system is closed and fluid pressure is in back of each valve element 133, 134, 135 and 136 to combine with their springs 137 to seat each valve. The shuttle valve 78 may be in any position, that is, either against one of its two seats 84 and 85 or in the intermediate position shown, depending upon the position in which the valve block as a whole is mounted. When the control valve A is shifted to the position shown in Figure 10, the line 50 is in direct communication with the reservoir through the line 52, relieving the pressure in the chamber 77 and line 50 and permitting the shuttle valve 78 to be raised by fluid pressure admitted through the inlet 61 until it engages its seat 84. At the same time pressure is being relieved in the chambers 129 and 131, making it possible for the two upper valve elements 133 and 135 to be unseated. Of course, the two lower valve elements 134 and 136 will remain seated since pressure is still maintained in back of these valve elements due to line 51 being closed. The valve element 133 is unseated by the pressure fluid entering at 61 and the pressure fluid will pass to the motor B through the lines 53 and 54 thereby actuating the piston within the motor to the right as viewed in Figure 10. Fluid being exhausted from the motor passes through the line 59 into the line 56 to unseat valve element 135 and thereby permit the exhausting fluid to pass to the reservoir through the line 62. In this position, the only flow to the reservoir through the control valve A is that which passes through the restricted passage 79 in the shuttle valve 78. It will be seen that the operation of this modified form of the invention is broadly the same as the operation previously described.

When the control valve A is shifted to the position shown in Figure 11, the shuttle valve 78 moves to its other seat 85 and the lower valves 134 and 136 will successively open in the manner previously described while the upper valves 133 and 135 will be seated by the combined action of the springs 137 and the pressure fluid. Of course, when the control valve is moved to this position, the piston of the motor is being moved to the left as viewed in Figure 11. When the control valve is shifted from an "on" position to the "off" position shown in Figure 9, the pressure is rapidly equalized through the shuttle passage 79 and leakage around the shuttle to seat the open pair of valves and maintain the other pair of valves in their seated position.

It will be apparent by reference to Figure 6 of the drawings that the reversing valve operates as a lock valve to prevent any movement of the piston in motor B due to any external forces applied thereon. This quality of the reversing valve of Figure 6 pertains regardless of whether or not there is pressure present in the inlet line 61. The form of reversing valve shown in Figures 9 to 11 will also operate as a lock valve, but it is to be understood that in this instance a shut-off valve would be incorporated in the inlet line 61 as indicated at 80 in order to prevent forces on the piston in motor B being effective to bring about an unseating of the valves and passage of fluid to the reservoir.

It has been explained that the form of the invention illustrated in Figures 9, 10 and 11 is diagrammatically illustrated, and that in the actual construction of the reversing valve the form of the main valve body or block and the side and top and bottom plates attached thereto will be the same as that illustrated in Figures 1 through 6 of the drawings. Thus it will be apparent that in both forms of the invention herein disclosed the reversing valve includes a body block having parallel sides, they being the sides to which the side plates 18 and 19 are attached, and parallel ends, they being the ends through which the ports 27 and 28 extend. In both forms the slide valve receiving cylinders will open through the top and bottom which are parallel and closed by the top and bottom plates, said plates having passages therein which communicate with the ends of the cylinders covered thereby. It is to be understood also that in both forms of the invention the diagonal ducts such as are shown in Figure 5 are provided for individually cross connecting one top cylinder with the nonaligned bottom cylinder, the side plates serving to at least partially close the diagonal ducts.

While two structural arrangements are herein disclosed as examples of embodiment of the invention, it is to be understood that the form of the apparatus can be variously changed without departing from the spirit and scope of the invention as defined in the appended claims.

I claim:

1. In a system of the character described, a device operable by introduction of pressure fluid thereinto, a remotely located control valve, a reversing valve interposed between said device and said valve and including an inlet port adapted to receive pressure fluid from a source of supply, and ducts connecting said valves and device, said reversing valve including a shiftable valve element directly subject at one end to pressure fluid from the inlet port, and shuttle valve means effective in one position for directing pressure fluid from the inlet port to the other end of said valve element to be there trapped as a column between the valve element and the control valve, and said control valve being operable to release the trapped column and permit pressure fluid at the inlet port end of the valve element to shift the valve element and pass from the inlet port into said device, said shuttle valve being shiftable upon operation of the control valve for releasing said trapped column to a position for permitting a more restricted flow of pressure fluid from said inlet port to the other end of said valve element.

2. In a system of the character described, a device operable by introduction of pressure fluid thereinto and the exhausting of fluid therefrom, a remotely located control valve, a reversing valve interposed between said device and said valve and including an inlet port adapted to receive pressure fluid from a source of supply, and a reservoir associated with said reversing valve, ducts connecting the device, the reversing valve, the control valve and the reservoir, and two independently shiftable valve elements in said reversing valve, and said reversing valve also including shuttle valve means having provision therein for allowing pressure fluid from the inlet port to collect as a trapped column between said valve elements and the control valve and prevent shifting of said valve elements, and said control valve being movable to release said column and permit one valve element to shift and direct pressure fluid through the reversing valve into the device and the other valve element to shift and direct pressure fluid from said device through the reversing valve to the reservoir, said shuttle valve being shiftable upon operation of the control valve for releasing said trapped column to a position for permitting a more restricted flow of pressure fluid from said inlet port to the end of said valve elements.

3. In a system of the character described, a device operable by introduction of pressure fluid thereinto and the exhausting of fluid therefrom, a remotely located control valve, a reversing valve interposed between said device and said valve and including an inlet port adapted to receive pressure fluid from a source of supply, and a reservoir associated with said reversing valve, ducts connecting the device, the reversing valve, the control valve and the reservoir, and two independently shiftable valve elements in said reversing valve, said valve elements having leaky slide fit in the reversing valve effective to permit pressure fluid from the inlet port to leak therepast and collect as a trapped column between said valve elements and the control valve and prevent shifting of said valve elements, and said control valve being movable to release said column and permit one valve element to shift and direct pressure fluid through the reversing valve into the device and the other valve element to shift and direct pressure fluid from said device through the reversing valve to the reservoir.

4. In a system of the character described, a device operable by introduction of pressure fluid thereinto and the exhausting of fluid therefrom, a remotely located control valve, a reversing valve interposed between said device and said valve and including an inlet port adapted to receive pressure fluid from a source of supply, and a reservoir associated with said reversing valve, ducts connecting the device, the reversing valve, the control valve and the reservoir, and two alternately operable sets of valve elements in said reversing valve each set comprising two independently shiftable valve elements, said reversing valve also including shuttle valve means having provision therein for allowing pressure fluid from the inlet port to collect as a trapped column between the valve elements of each set and the control valve and prevent shifting of said valve elements, and said control valve being operable to selectively release the trapped columns to the reservoir so as to permit one valve element of the selected set to shift and direct pressure fluid through a selected inlet into the device and the other valve element of the selected set to direct pressure fluid from the device through the reversing valve to the reservoir while holding the non-selected set of valve elements against shifting, said shuttle valve being shiftable upon operation of the control valve for releasing said trapped column to a position for permitting a more restricted flow of pressure fluid from said inlet port to the end of said valve element.

5. In a system of the character described, a device operable by introduction of pressure fluid thereinto and the exhausting of fluid therefrom, a remotely located control valve, a reversing valve interposed between said device and said valve and including an inlet port adapted to receive pressure fluid from a source of supply, and a reservoir associated with said reversing valve, ducts connecting the device, the reversing valve, the control valve and the reservoir, and two alternately operable sets of valve elements in said reversing valve each set comprising two independently shiftable valve elements, said valve elements having leaky slide fit in the reversing valve effective to permit pressure fluid from the inlet port to leak therepast and collect as a trapped column between the valve elements of each set and the control valve and prevent shifting of said valve elements, and said control valve being operable to selectively release the trapped columns to the reservoir so as to permit one valve element of the selected set to shift and direct pressure fluid through a selected inlet into the device and the other valve element of the selected set to direct pressure fluid from the device through the reversing valve to the reservoir while holding the non-selected set of valve elements against shifting.

6. A reversing valve of the character described comprising, a casing having two sets of valve element slide bores each comprising a pair of bores arranged side by side and having seats at their inner ends, an inlet port adapted to be connected with a source of pressure fluid and communicating with one slide bore of each set through the seat thereof, an outlet port adapted to be connected with a reservoir and communicating with the remaining two slide bores through the seats thereof, a port associated with each said bore set and adapted for connection with a control valve and connected with both bores of the respective set at the ends thereof remote from their seats, and two ports adapted to be connected with inlet and outlet ports of a fluid pressure operated device and each communicating with one bore of one set and one bore of the other set at points just above the seats thereof, and a valve element slidable in each bore and having a reduced diameter end portion engageable with the respective bore seat, each slide bore of each set being axially aligned with a slide bore of the other set, said inlet and outlet ports being axially aligned, said ports for control valve connection being axially aligned, and said ports for said device connection being axially aligned.

7. In a system of the character described, a motor including a reciprocable piston, a remotely located control valve, a reversing valve interposed between said motor and valve and including a casing having two sets of valve element slide bores each set comprising a pair of bores arranged side by side and having seats at their inner ends, an inlet port communicating with one slide bore of each set through the seat thereof, an outlet port communicating with the remaining two slide bores through the seats thereof, a control port common to each bore set at the bore ends remote from the respective set of seats, two motor ports each duct-connected to a distinct end of the motor and communicating with one bore of one set and one bore of the other set at points just above the seats thereof, a valve slidable in each bore and engageable with the particular bore seat, means connecting the inlet port with a source of pressure fluid, means connecting the outlet port with a reservoir, and means connecting each control port with the control valve and the control valve with the reservoir.

8. In a system of the character described, a motor including a reciprocable piston, a remotely located control valve, a reversing valve interposed between said motor and valve and including a casing having two sets of valve element slide bores each set comprising a pair of bores arranged side by side and having seats at their inner ends, an inlet port communicating with one slide bore of each set through the seat thereof, an outlet port communicating with the remaining two slide bores through the seats thereof, a control port common to each bore set at the bore ends remote from the respective set of seats, two motor ports each duct-connected to a distinct end of the motor and communicating with one bore of one set and one bore of the other set at points just above the seats thereof, a valve slidable in each bore and engageable with the particular bore seat, means connecting the inlet port with a source of pressure fluid, means connecting the outlet port with a reservoir, and means connecting each control port with the control valve and the control valve with the reservoir, said control valve having a ported shiftable element effective to close communication between the control ducts and the reservoir to trap pressure fluid and prevent movement of the valves or for opening said communication with the reservoir to relieve the trapped pressure fluid.

9. A reversing valve of the character described comprising a body block having parallel sides, parallel ends and a top and bottom bearing parallel relation, said block having two bores extending in parallel relation therethrough from top to bottom, each said bore being counterbored to provide a top or bottom cylinder and an inwardly directed valve seat, a piston valve slidable in each cylinder and having a reduced diameter inner end portion engageable with the respective seat for controlling passage of fluid through the respective seat between the respective cylinder and bore, said block also having a single fluid inlet port opening through an end thereof into one said bore between the seats associated therewith and also a single fluid waste port axially aligned with said inlet port and opening through the other end thereof from the other bore between the seats associated therewith, a diagonal duct in each side of the block individually cross connecting one top cylinder with the non-aligned bottom cylinder and opening into the cylinders adjacent the seats and opposite the reduced diameter piston valve end portions, a side plate secured to each side of the block and forming at least a partial closure for the respective diagonal duct, each said side plate having a fluid flow and return port opening therethrough from the duct covered thereby, a top plate covering the top cylinder ends and a bottom plate closing the bottom cylinder ends, each said top and bottom plate having a passage therein communicating with the ends of the cylinders covered thereby and a waste port opening therethrough from said passage.

10. Valve structure as defined in claim 9 in which each piston valve has a loose slide fit in its cylinder to provide for fluid leakage past the piston valves into the cylinder ends and the connecting top and bottom plate passages.

11. Valve structure as defined in claim 9 in which there is included a bleed duct constantly open to communication between the inlet port and each top and bottom plate passage and the cylinder ends communicating therewith.

12. Valve structure as defined in claim 9 in which the block includes a shuttle valve chamber arranged in parallel relation between the parallel bores, a shuttle valve loosely slidable in said chamber and having an annular central clearance, reduced diameter valve end portions, a central cross bore opening through the sides of said clearance, and a bleed duct extending axially therethrough from end to end, the block also having a passage communicating between said chamber and the inlet port between the associated valve seats and opposite the shuttle valve clearance, and a duct communicating between each end of the chamber and the respective top or bottom plate passage and providing a seat for the respective end of the shuttle valve through which the shuttle valve bleed duct always will communicate.

ROBERT H. DAVIES.

REFERENCES CITED

The following references are of record in the file of this patent:

UNITED STATES PATENTS

| Number | Name | Date |
|---|---|---|
| 425,202 | Blanchard | Apr. 8, 1890 |
| 537,103 | Berry | Apr. 9, 1895 |
| 639,673 | Dyblie | Dec. 19, 1899 |
| 1,636,859 | Dempler | July 26, 1927 |
| 1,777,128 | Powell | Sept. 30, 1930 |
| 1,930,557 | Hughes | Oct. 17, 1933 |
| 1,952,806 | Hyland | Mar. 27, 1934 |
| 2,132,811 | Tomkins | Oct. 11, 1938 |
| 2,376,918 | Hughes | May 29, 1945 |

FOREIGN PATENTS

| Number | Country | Date |
|---|---|---|
| 23,822 | Great Britain | of 1898 |
| 356,133 | Great Britain | Oct. 1, 1931 |
| 557,584 | Germany | Aug. 25, 1932 |
| 40,250 | Austria | Dec. 27, 1909 |